3,461,918
CORROSION PROTECTION
Robert V. Gerner, Bartlesville, Okla., assignor to Phillips Petroleum Company, a corporation of Delaware
Filed Aug. 29, 1966, Ser. No. 575,821
Int. Cl. F16l 9/02, 9/18, 9/20
U.S. Cl. 138—148     7 Claims

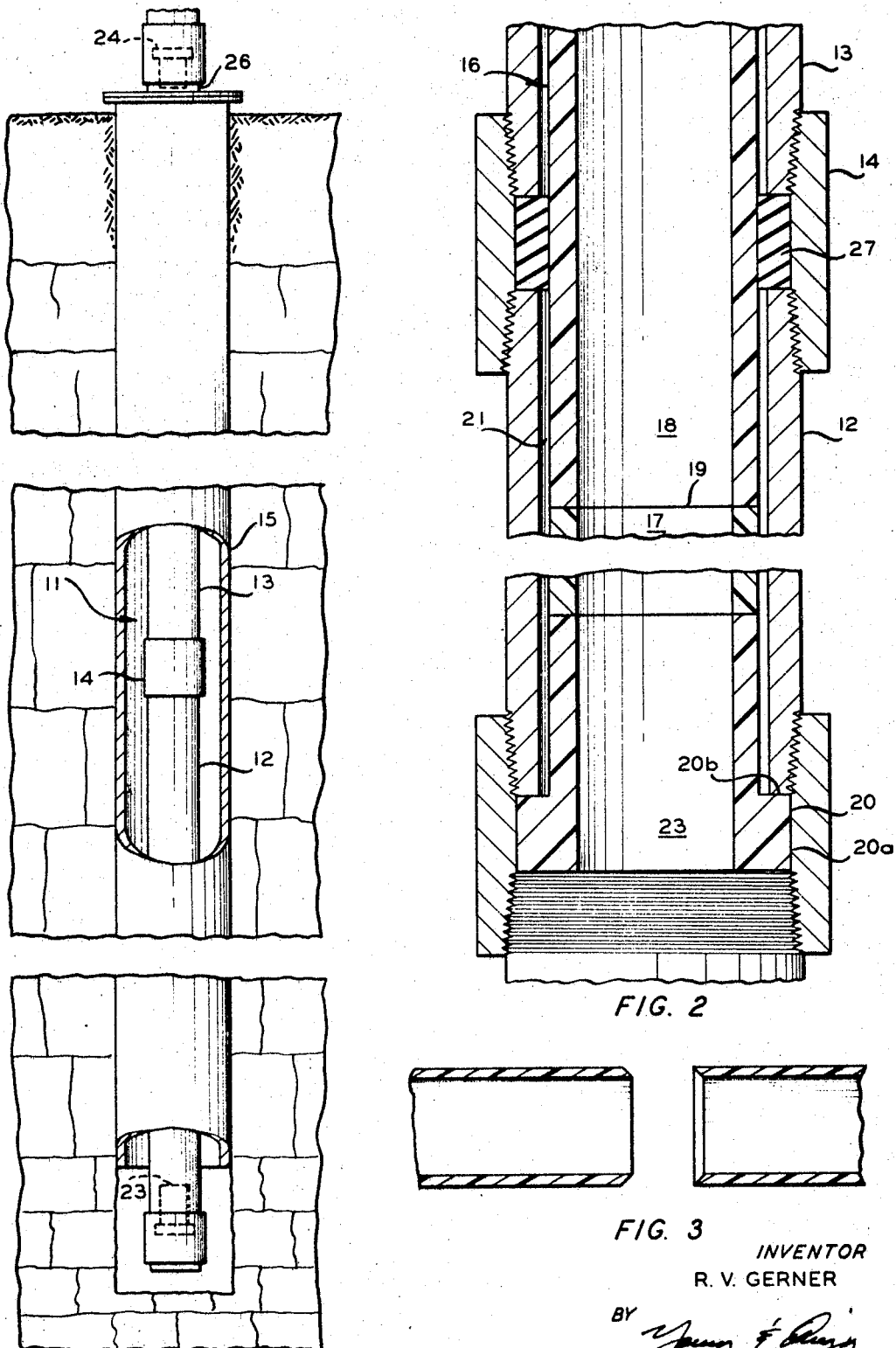

ABSTRACT OF THE DISCLOSURE

Corrosion is reduced in a corrodible structure, such as a pipe carrying corrosive fluids, by inserting liner sections of noncorrodible material, such as polyethylene, spacing the liner sections from the wall of the structure to leave an annulus, and leaving unsealed joints between the liner sections so fluid is allowed to seep through the joint and maintain a pressure equilibrium of the fluid between the inside and exterior of the liner. The passage of fluid in the annulus is not sufficient to produce a washing effect on the corrodible enveloping structure.

---

This invention relates to the prevention of corrosion. In one aspect it relates to a corrosion-resistant structure comprising a non-corrodible liner enclosed within an enveloping corrodible structure. In another aspect it relates to a method for preventing corrosion of a corrodible structure.

It is desirable to prevent corrosion of various structures, for example, metal tanks and pipes which store or transfer corrosive fluids. Although attempts have been made to use non-corrodible liners, such liners are not always completely successful.

An object of my invention is to prevent corrosion of a corrodible structure.

Another object of my invention is to provide a corrosion-resistant structure.

A further object of my invention is to produce a non-corrodible, continuous liner having a plurality of sections which, upon a pressure drop within the liner, will not collapse.

Other aspects, objects and advantages of my invention will be apparent to one skilled in the art from a study of the written description, the drawing and the claims.

According to my invention a continuous non-corrodible liner comprising a plurality of sections which abut at their ends is inserted within a corrodible structure. The corrosive fluid is permitted to contact the corrodible structure but the fluid is maintained substantially static between the liner and the structure and corrosion is retarded. The sections of the non-corrodible liner are not welded or cemented together, thus simplifying the installation and removal of the liner.

Further according to my invention, single joints of liner, made of a flexible material such as polyethylene, nylon, epoxy, epoxy fiberglass, rubber, copolymers of ethylene and 1-butene, and other materials capable of being formed into a pipe are applied to the inside of a metal pipe. Such a liner is fashioned from joints by inserting each joint into said metal pipe such that the ends of each joint of the liner forcibly contact the end of adjoining joints.

Further according to my invention, the ends of the individual joints of said liner are finished in a manner to insure a reasonably close fit with adjacent joints, thus forming a semi-seal between the adjacent joints. The semi-seal so formed prevents a washing (scrubbing) action on the metal pipe, but at the same time permits a fluid within the annulus formed by the liner within the metal pipe and a fluid within the liner to equalize. The semi-seal is formed by using joints having squared off ends or mating tapered ends. The term "semi-seal" as used in the present application means a fluid permeable joint formed by abutting two sections of a linear together such that fluid is allowed to seep through the joint to maintain equilibrium of the fluid between the inside and exterior of the liner but not in sufficient quantities to produce a washing (scrubbing) effect due to escaping liquid.

Further according to my invention, an inhibitor film is placed between the liner and the corrodible structure at the time the liner is placed within the corrodible structure. The inhibitor film may be installed by any suitable method. Some examples of suitable methods are (1) painting an inhibitor either in the pure form or a dilute solution of the inhibitor, on the joints of the liner as they are inserted into the corrodible structure, or (2) by swabbing such a liquid through a metal pipe as individual joints are connected and before inserting the liner, or (3) in the case of tubing in a water or oil and water producing well, by dumping sufficient inhibitor or an oil and inhibitor mixture into the tubing prior to inserting the lining, or down the annulus of the well so it will wet the tubing when the well is produced.

When a film of corrosion inhibitor is placed on the structure wall prior to installation of the liner, the liner prevents removal of the film by scrubbing action since the corrosive fluid between the liner and the enveloping pipe remains substantially static.

Further according to my invention, non-corroding filler rings are used in coupling recesses to support the continuous liner.

By the practice of my invention, the pressure within a structure protected according to the invention can be reduced without collapse of the liner. Further, the operating pressure is limited only by the rating of the structure itself and not by the rating of the liner. This, also, is useful when the invention is applied to a well pipe.

In the drawing,

FIGURE 1 is a vertical elevation partly in cross-section of a well having therein a corrodible well pipe protected by a non-corrodible liner according to the invention.

FIGURE 2 is a vertical cross-section of a portion of the pipe and liner of FIGURE 1.

FIGURE 3 is a cross-section of a liner having internally and externally tapered mating ends.

In the drawings, a pipe string 11 comprising threaded joints, such as threaded joint 12 and threaded joint 13, connected by internally threaded coupling means 14 is inserted into well casing 15. A liner 16 comprising separate joints of plastic pipe, such as plastic pipe joints 17 and 18 which are slightly smaller than the I.D. of pipe 11, is inserted within pipe string 11 thereby forming an annulus 21 therebetween. Joints 17 and 18 abut together as indicated at 19 to form a semi-seal therebetween.

A first supporting ring 23 having an I.D. equal to or slightly larger than the I.D. of the plastic pipe joints forming liner 16 is inserted at the end of the lowermost pipe joint, pipe 12, which is inserted into the well. Supporting ring 23 comprises a plastic segment 20 and an external upset 20(a) having a shoulder 20(b) which is inserted between two threaded joints of pipe string 11 and secured in place by a coupling means as shown. Supporting ring 23 supports plastic joint 17 within metal pipe 12. After pipe 12, containing plastic pipe joint 17, is lowered within the well, pipe 13 attaches to pipe 12 by coupling means 14. Plastic pipe joint 18 then is inserted within pipe 13 and abutted against plastic pipe joint 17. As can be seen, it is not essential that the plastic pipe joints be the same length as the metal pipe joints. If the previously inserted plastic joint is somewhat below the upstanding end of the last inserted metal pipe joints, the subsequently inserted next plastic pipe joint will abut as illustrated at point 19. On the other hand, if the last inserted plastic pipe joint extends slightly above the upstanding end of the metal pipe joint, the next metal pipe joint can be positioned over the end thereof following which the next plastic joint is inserted.

After the desired length of the pipe is inserted into the well, a second supporting ring 24, similar to supporting ring 23, is inserted in the end of the uppermost metal pipe joint, pipe joint 26, in FIGURE 1 abutting against the uppermost plastic pipe joint which is cut to the desired length as it is inserted. A pipe nipple is compressed against the upper surface of support ring 24 by coupling 14 to maintain liner 16 in place. Preferably, the several joints of plastic pipe are held in slight compression by rings 23 and 24. The several joints of plastic pipe together form a continuous non-corrodible liner having abutting, unsealed joints, each joint ranging from 20 feet to 40 feet in length.

Annulus 21 formed by liner 16 and pipes 12 and 13 can be filled with a liquid containing a corrosion inhibitor. Alternatively, annulus 21 can be filled with the fluid transmitted through liner 16. In both cases, the fluid is static and does not abrade the interior walls of pipes 12 and 13. When a corrosion inhibitor is added, an inhibiting film forms on the inner surface of pipes 12 and 13.

The inhibitor film remains in place for a relatively long period of time without replacement because of the static conditions provided in annulus 21 by protective liner 16. It has been found that corrosion within the enveloping structure often is prevented even though no oil or inhibitor has been placed in the well in the meantime. Since in normal practice, when liners are not used, it is necessary to continuously renew the inhibitor to achieve corrosion protection, the maintenance of the inhibitor film is a result of liner 16, which although not preventing corrosive fluids from entering annulus 21 between liner 16 and pipes 12 and 13, still prevents corrosion by preventing sufficient circulation within annulus 21 to remove the inhibitor film.

FIGURE 3 illustrates another embodiment of protective liner 16 wherein the abutting ends of the plastic joints have different mating surfaces.

In these embodiments, a semiseal is formed, thus allowing equilibrium to be established between the corrosive fluids within the liner and corrosive fluids within the annulus formed by the plastic liner 21 and the metal pipe.

Tests have been run both with and without the use of a corrosion inhibitor as described above. In both instances, corrosion was prevented or greatly retarded. In both instances, the liner permits flow of fluids between the inside of liner 16 and annulus 21, thus equalizing the pressure therebetween and preventing either bursting or collapse of the liner with changes in pressure. It is believed that the prevention or retardation of corrosion is due to maintaining a substantially static body of fluid in annulus 21. When no corrosion inhibitor is used, corrosion is greatly retarded even though the fluid is corrosive since no washing action occurs and corrosion is limited to that caused by a relatively small amount of fluid. When a corrosion inhibitor is used, the maintaining of substantially static conditions in annulus 21 obviates the necessity for frequent additions of inhibitor.

Although good results can be obtained in many instances without their use, an important part of one aspect of the invention is the use of rings 27 in the recesses in coupling means 14 between joints 12 and 13 of the pipe 11. Rings 27 assist in prevention of corrosion in coupling means 14 and in pipe joints 12 and 13 by preventing free movement of fluids through and across the surface of coupling means 14. Rings 27 are particularly useful in horizontal pipes although they are also useful in vertical strings, particularly longer strings wherein the liner can rest against one side of the pipe.

Rings 27 also serve to prevent the flow of the fluid down annulus 21 at a greater rate than the fluid is released between joints 17 and 18 of liner 16. When fluid is injected into a well but, there is an interruption resulting in the fluid level within the tubing dropping quite rapidly, rings 27 slow down the flow of fluid through annulus 21 and thereby prevent a fluid head of such magnitude as would collapse the liner.

EXAMPLE I

A plastic liner for downhole tubing was produced from ultrahigh molecular weight, high density plastic pipe comprising a copolymer of ethylene and 1-butene having a high load melt index of 1.9 (ASTM D–1238–57T) and a density of 0.955 (ASTM D–1505–57T). The plastic pipe was cut into joints having squared-off ends. The plastic liner had an O.D. of 2.375 inches and was inserted into downhole tubing which had a 2⅞ O.D. and 2.441 I.D. (average) in a 2900 foot well producing salt water containing hydrogen sulfide. Top and bottom holding means (rings 23 and 24) and rings 27 were inserted into the downhole tubing. Kontol 147, an organic corrosion inhibitor by Petrolite Corporation, was added to crude oil to form a 50%–50% by volume mixture. The mixture of inhibitor and crude oil was applied to the outside of the liner as the liner joints were inserted. Additional inhibitor was placed in the annulus between the weel tubing and the casing from the surface by pouring in and washing down with well fluid. The additional inhibitor wa sa 5 percent by volume mixture of inhibitor (Kontol 147) in oil. Approximately 30 barrels of the 5 percent mixture were placed in the annulus from the surface.

Upon subsequent inspection of the downhole tubing it was found to have developed a leak in an upper area where, due to a faulty installation, the ends of two of the liner joints had separated from 2–4 inches. This large separation apparently allows sufficient fluid turbulence to develop between the annulus formed by the liner and the downhole tubing to wash off the inhibitor. However, no leaks were detected in areas where the joints of the plastic liner had not separated even though the other junctions between the liner joints were not liquid tight. A new section of downhole tubing was inserted in place of the section containing the leak and the original plastic linear was again inserted within the tubing. The original liner was undamaged because the unsealed abutting joints of the liner enabled equalization of pressure between the inside of the liner and the annulus between the tubing and the liner thereby preventing collapse of the liner.

EXAMPLE II

A liner having the same physical properties as the liner in Example I was inserted into downhole tubing in a 3000 foot well for handling salt water with traces of hydrogen sulfide and carbon dioxide. The downhole tubing had an O.D. of 2⅜ inches and an I.D. of 1.995 inches (average) and the plastic liner had an O.D. of 1.9 inches. The ends of the liner segments were tapered about 45° to help center the liner within the downhole tubing as it was inserted. Top and bottom holding means were employed to hold the liner within the downhole tubing. No inhibitor was added to the downhole tubing, the plastic liner, or the annulus formed therewith. After extended service, no leak has been detected, thus indicating the protective characteristics and desirable features of the liner.

From the above description, it will be apparent to those skilled in the art that changes may be made in the combination and arrangement of the parts as heretofore set forth in the specification and shown in the drawing and certain modifications as to the abutting of the inner lining, the formation of the annulus or the sealing of an inner lining as well as other modifications may be made by one skilled in the art and are within the spirit of the invention and within the scope of the invention. For example, the invention is applicable to horizontal as well as vertical pipes as well as to structures other than pipes.

I claim:

1. A corrosion resistant structure comprising a continuous tubing formed of a corrodible material, and a continuous flexible liner enclosed within said tubing and forming a space therebetween; said liner comprising a plurality of individual unwelded sections which abut at their ends, the ends of said individual sections of said liner having a finish which ensures a reasonably close fit with the end of an adjacent section to form a fluid permeable unsealed joint such that fluid is allowed to seep through the joint to maintain equilibrium of the fluid between the inside and exterior of said liner but not in an amount sufficient to produce a washing effect on the inside surface of said tubing due to escaping fluid, said sections of said liner being made of non-corrodible material.

2. A corrosion resistant structure according to claim 1 wherein noncorroding filler rings positioned within said space between said liner and the enveloping corrodible tubing and continuously contacting said continuous flexible liner and said corrodible enveloping tubing at the coupling recesses of said corrodible enveloping tubing so as to prevent free movement of fluids through and across the surface of the coupling recesses at the joint of said corrodible tubing and supporting said continuous flexible liner.

3. A corrosion resistant structure according to claim 1 wherein said liner is positioned and supported within said corrodible tubing by noncorrodible supporting means, said supporting means producing a compression on said liner.

4. A corrosion resistant structure according to claim 1 wherein said corrodible tubing is a pipe.

5. A corrosion resistant structure according to claim 1 wherein the abutting ends of the liner sections have squared-off ends.

6. A corrosion resistant structure according to claim 1 wherein the abutting ends of the liner sections have tapered ends.

7. A corrosion resistant structure according to claim 1 wherein said continuous tubing is downhole tubing for an oil well producing salt water containing hydrogen sulfide and wherein said non-corrodible material is an ethylene polymer and said liner is enclosed within said downhole tubing and forms a space therebetween said liner sections having squared-off ends which abut with each other to form a fluid permeable unsealed joint and wherein a first support ring having an upper and lower surface is positioned within the lowermost section of said downhole tubing and maintained in place by a pipe nipple compressed against the lower surface of said support ring by a coupling, and a second support ring having an upper and lower surface is positioned within the uppermost sections of said downhole tubing and maintained in place by a pipe nipple compressed against the upper surface of said second support ring, said first and second support rings cooperating to maintain said liner in position within said downhole tubing.

References Cited

UNITED STATES PATENTS

| | | | |
|---|---|---|---|
| 1,737,270 | 11/1929 | Sargent | 138—148 X |
| 1,792,941 | 2/1931 | Stevenson | 138—148 X |
| 2,982,311 | 5/1961 | Haskell | 138—148 X |
| 2,982,360 | 5/1961 | Morton et al. | 166—1 X |
| 3,040,760 | 6/1962 | Macks | 285—55 X |
| 3,192,612 | 7/1965 | Elliott et al. | 285—55 X |
| 3,255,821 | 6/1966 | Curlet | 166—228 X |
| 3,280,911 | 10/1966 | Strange et al. | 166—228 |

DAVID H. BROWN, Primary Examiner

U.S. Cl. X.R.

285—55